United States Patent
Roderes et al.

(10) Patent No.: US 11,346,699 B2
(45) Date of Patent: May 31, 2022

(54) CAPACITIVE GAUGE WITH LAMELLAR ELECTRODES HELD BY SPACER(S)

(71) Applicant: Luxembourg Patent Company S.A., Lintgen (LU)

(72) Inventors: Privat Roderes, Habergy (BE); Philippe Schmitz, Steinsel (LU)

(73) Assignee: ROTAREX S.A., Lintgen (LU)

( * ) Notice: Subject to any disclaimer, the term of this patent is extended or adjusted under 35 U.S.C. 154(b) by 0 days.

(21) Appl. No.: 17/278,730

(22) PCT Filed: Oct. 2, 2019

(86) PCT No.: PCT/EP2019/076680
§ 371 (c)(1),
(2) Date: Mar. 23, 2021

(87) PCT Pub. No.: WO2020/070180
PCT Pub. Date: Apr. 9, 2020

(65) Prior Publication Data
US 2022/0034699 A1 Feb. 3, 2022

(30) Foreign Application Priority Data
Oct. 2, 2018 (LU) .......................................... 100942

(51) Int. Cl.
*G01F 23/26* (2022.01)
*G01F 23/263* (2022.01)

(52) U.S. Cl.
CPC .................................. *G01F 23/268* (2013.01)

(58) Field of Classification Search
CPC .................................................... G01F 23/268
See application file for complete search history.

(56) References Cited

U.S. PATENT DOCUMENTS

| 2,426,252 | A | * | 8/1947 | Craig | G01F 23/263 |
| | | | | | 174/152 R |
| 5,115,680 | A | * | 5/1992 | Lew | G01L 1/20 |
| | | | | | 33/788 |
| 5,847,568 | A | * | 12/1998 | Stashkiw | A01G 25/167 |
| | | | | | 324/696 |
| 2006/0112992 | A1 | | 6/2006 | Schmitz et al. | |

(Continued)

FOREIGN PATENT DOCUMENTS

| DE | 20319370 U1 | 3/2004 |
| EP | 2772731 A1 | 9/2014 |
| WO | 20160116355 A1 | 7/2016 |

OTHER PUBLICATIONS

International Search Report for PCT/EP2019/076680 dated Dec. 18, 2019.

*Primary Examiner* — Francis C Gray
(74) *Attorney, Agent, or Firm* — Sandberg Phoenix & von Gontard PC

(57) ABSTRACT

A capacitive level gauge for a container of a medium like compressed gas or liquid, comprising a body configured for being mounted on the container; two parallel lamellar electrodes extending from the body, for being inside the container and in contact with the medium; wherein the capacitive level gauge further comprises at least one spacer with two slots engaging with the two electrodes, respectively, maintaining a constant distance between the electrodes.

16 Claims, 4 Drawing Sheets

(56) References Cited

U.S. PATENT DOCUMENTS

| | | | |
|---|---|---|---|
| 2009/0301190 A1* | 12/2009 | Ross, Jr. ............... | G01F 23/265 |
| | | | 73/304 C |
| 2012/0240675 A1* | 9/2012 | Farmanyan ........... | G01F 23/268 |
| | | | 73/304 C |
| 2014/0352429 A1* | 12/2014 | Murata ................. | G01F 23/268 |
| | | | 73/304 C |
| 2021/0333140 A1* | 10/2021 | Cerutti ................. | G01F 23/268 |

* cited by examiner

CAPACITIVE GAUGE WITH LAMELLAR ELECTRODES HELD BY SPACER(S)

CROSS-REFERENCE TO RELATED APPLICATIONS

The present invention is the US national stage under 35 U.S.C. § 371 of International Application No. PCT/EP2019/076680, which was filed on Oct. 2, 2019, and which claims the priority of application LU 100942 filed on Oct. 2, 2018, the content of which (text, drawings and claims) are incorporated here by reference in its entirety.

FIELD

The invention is directed to the field of capacitive level gauges for a medium in a container, in various instances, for a compressed and liquified gas in a container. The invention is also directed to electrodes of capacitive gauges and to spacers for such electrodes.

BACKGROUND

A capacitive level gauge is based on measuring the capacitance between two electrodes immersed in a dielectric medium in a container, like a gas or a liquid. The level of the medium in the container determines the length of the electrodes whose capacitance is modified. It can therefore be determined by the measurement of the capacitance.

Prior art patent document published EP 2 772 731 A1 discloses a capacitive level gauge according to the preamble of claim 1 and a spacer for electrodes of a capacitive level gauge, according to the preamble of claim 8.

Prior art patent document published US 2006/0112992 A1 discloses a valve assembly with a capacitive level gauge. The assembly comprises a body to be mounted on a wall of a container, the body comprising a gas passage so as to allow a flow of gas form the container to an outlet, when in service, and also in the reverse direction, when refilling the container. An electrical lead extends also through the body in a gas tight fashion. The assembly comprises also two parallel lamellar electrodes attached to an inner side of the body. More specifically, one of the electrodes is attached to the body, e.g. by press-fitting, whereas the other one is distant from the body and is electrically connected to the electrical lead via a wire. The electrodes are held at a constant distance relative to each other by means of spacers interposed between the electrodes and held in position by a fastener such as a rivet or a screw extending through holes in the electrodes and spacers. Assembling these spacers is time consuming and also can weaken the electrodes in view of the holes made there through.

Prior art patent document published WO 2016/116355 A1 discloses a capacitive level gauge with a tubular electrode and a rod-shaped electrode concentric inside the tubular electrode. The rod-shaped electrode comprises on its front end an axial hole that is inserted and fitted around an electrical lead extending through the body in a gas tight fashion. The mounting of the electrodes is thereby rendered easier and the electrical connection is more reliable. However, concentric electrodes have for drawback that they cannot be elastically bent, e.g. during insertion thereof in the container during assembly.

Prior art patent document published DE 203 19 370 U1 discloses a capacitive level gauge with two rod-shaped and parallel electrodes. They are held in position relative to each other by means of spacers with a general shape of a C and with two recesses in which the rod-shaped electrodes can snapped. The mounting of the spacers is particularly convenient and rapid. Such spacers are however suitable specifically for rod-shaped electrodes. Such electrodes are not as such flexible. Also, the sensitivity of the sensor is potentially lowered in view of the distance between the electrodes and their reduced outer surfaces.

SUMMARY

The invention has for technical problem to overcome at least one of the drawbacks of the above cited prior art. More specifically, the invention has for technical problem to provide an improved capacitive level gauge with regard to the electrodes, in particular their sensitivity and the ease of mounting thereof, while remaining versatile for various shapes of containers.

The invention is directed to a capacitive level gauge for a container of a medium like compressed gas or liquid, comprising: a body configured for being mounted on the container two parallel lamellar electrodes extending from the body, for being inside the container and in contact with the medium; wherein the capacitive level gauge further comprises at least one spacer with two slots engaging with the two electrodes, respectively, maintaining a constant distance between the electrodes.

According to an exemplary embodiment, the at least one spacer is made of plastic.

According to an exemplary embodiment, several of the at least one spacer are distributed along the electrodes.

According to an exemplary embodiment, the at least one spacer elastically deforms the electrodes so as to generate frictional forces holding the spacer in place without further fixation means.

According to an exemplary embodiment, the at least one spacer is configured to be slid around and along the electrodes.

According to an exemplary embodiment, for each of the at least one spacer, the two slots are generally parallel to each other.

According to an exemplary embodiment, the electrodes show a curved cross-sectional profile, the profile, in various instances, being curved with a radius greater than 10 mm and/or lower than 20 mm.

Advantageously, the electrodes have a length that is greater than 10 mm and/or less than 20 mm.

Advantageously, the slots have a length that is greater than 10 mm and/or less than 20 mm.

According to an exemplary embodiment, for each of the at least one spacer, the two slots are generally straight.

Advantageously, the body is configured for being mounted on the container and has an inner side in contact with the medium when mounted on the container; an electrical lead extending in a gas tight manner through the body; a first one of the electrodes being electrically connected to the electrical lead and the second one of the electrodes being electrically connected to the body; wherein the electrical lead is protruding on the inner side and the first electrode has an end lateral face in pressure contact with the electrical lead, the contact providing the electrical connection between the electrode and lead.

Advantageously, the second electrode has an end lateral face in pressure contact with a body portion, the contact providing the electrical connection between the electrode and body.

Advantageously, the end lateral faces of the first and second electrodes are at the same level along the electrodes.

Advantageously, the body portion is protruding on the inner side of the body.

Advantageously, the electrical lead is at a central position of the body, the body portion being off-set from the central position.

Advantageously, the body portion is arcuate with two ends forming distant contact areas with the second electrode.

Advantageously, the gauge further comprises a member mounted on the body and holding the first electrode in pressure contact with the electrical lead, the member being of electrically insulating material.

Advantageously, the holding member holds the second electrode in pressure contact with the body portion.

Advantageously, the holding member comprises a first slot tightly receiving the first electrode.

Advantageously, the holding member comprises a second slot tightly receiving the second electrode.

Advantageously, the holding member is snap fitted in the body.

Advantageously, the holding member comprises a proximal front end engaging with the body and a distal end holding the first electrode and, where appropriate, the second electrode.

Advantageously, the holding member comprises a fastener extending through the distal end, the first electrode and, where appropriate, the second electrode.

Advantageously, the body comprises on the inner side a cavity receiving the proximal front end of the holding body.

Advantageously, the end lateral face of the first electrode and, if appropriate of the second electrode, is on the convex side of the electrode.

Advantageously, the gauge further comprises an electronic display device electrically connected to the electric lead and the body and configured for displaying an indication of the level of gas in the container.

Advantageously, the body comprises a gas inlet on the inner side, a gas outlet on an outer side, a passage interconnecting the inlet and outlet, and a valve for selectively shutting-off the passage.

The invention is also directed to a spacer for electrodes of a capacitive level gauge, comprising an element with areas configured for receiving and holding the electrodes; wherein the areas are slots configured for receiving lamellar electrodes.

Advantageously, the element is plate with a rectangular shape. The outer edge thereof is advantageously rounded.

According to an exemplary embodiment, each of the slots is elongate and forms a closed contour.

According to an exemplary embodiment, each of the slots comprises a main portion and end portions, the end portions having an average width that is less than an average width of the main portion.

According to an exemplary embodiment, the main portion comprises a central sub-portion with a reduced width.

According to an exemplary embodiment, each of the slots shows a straight neutral axis.

The invention is particularly interesting in that it provides an interesting solution for providing a versatile capacitive level gauge that is also easy to manufacture and to customize during installation on a container. Lamellar electrodes are particularly interesting in that they can be elastically bent during insertion into various shapes of containers. The spacer according to various embodiments of the invention provides a cheap and performing solution for keeping a constant distance between the electrodes. Also, during mounting of a capacitive level gauge, it is common to adapt the length of the electrodes to the container. In that case, the spacers can be moved along the pair of electrodes whose length has been adapted, e.g. by cutting, and positioned at proper positions which can depend on the shape of the container. The arcuate or curved cross-sectional profile of the electrodes is interesting in that that it provides a certain rigidity which is useful for keeping a proper configuration and position in a container while being elastically flexible, in particular once the profile of the electrode is flattened upon bending, similarly to a tape measure whose ribbon is made of metal with a curved cross-section. This means also that the electrodes can be elastically rolled for transport and packaging, which is particularly useful, for their length can be of several meters, depending on the application.

DRAWINGS

DETAILED DESCRIPTION

FIGS. 1 to 5 illustrate a capacitive level gauge according to a first exemplary embodiment of the invention.

Figure 1:
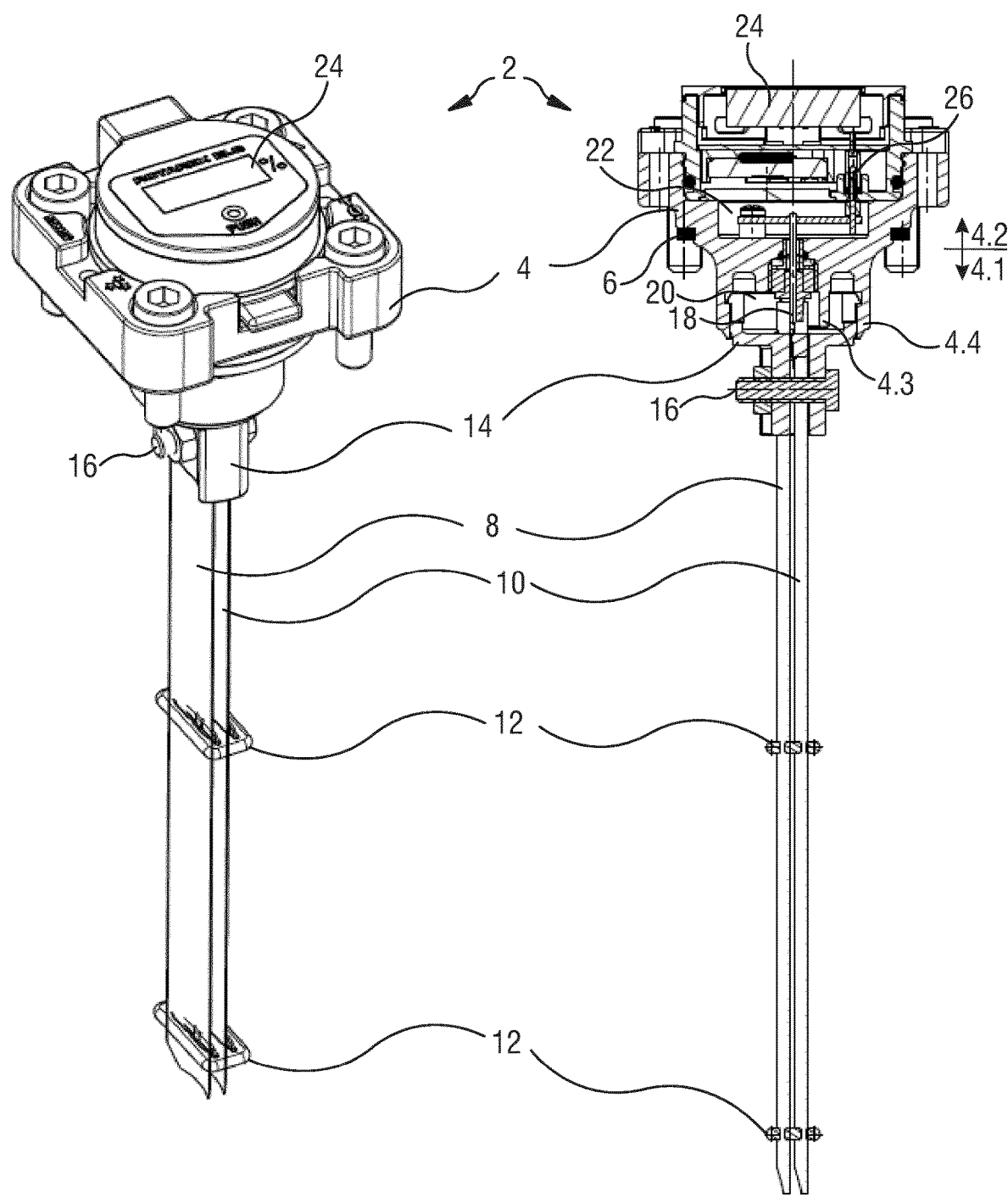
FIG. 1 is a perspective view and a sectional view of a capacitive level gauge according to a first exemplary embodiment of the invention.

FIG. 1 shows a perspective view and a corresponding sectional view of the gauge.

The level gauge 2 comprises a body 4 designed to be mounted on a wall of a container (not represented). The container can for instance be filled with compressed and liquefied gas like for example butane or propane. In this exemplary embodiment, a gasket 6 is provided on a ring-shaped surface of the body for contacting a corresponding surface on the wall of the container, so as to provide a gas tight contact between an inner side 4.1 and an outer side 4.2 of the body. For instance, the body 4 is provided with four holes receiving fastening screws configured for engaging corresponding female threads on the wall of the container. It is however understood that other configurations for fastening the body to the container and/or for providing a gas tight contact with the container can be considered, in particular according to the technical common knowledge in the field of pressurized containers.

As this is apparent in FIG. 1, the gauge 2 comprises a pair of electrodes 8 and 10. The electrodes 8 and 10 are lamellar and extend along a main direction parallel to each other. They are kept at a constant distance from each other by means of the spacers 12. The proximal ends of the electrodes 8 and 10 are attached to the body 4 by means of the holding element 14. The latter is made of electrically insulating material, e.g. plastic, and comprises two slots, each receiving one of the electrodes 8 and 10. The holding element 14 is attached to the body 4 on the inner side 4.1 thereof. A fastener 16, e.g., a screw, is inserted transversally through a hole in the holding element and corresponding holes in the electrodes 8 and 10, for securely fastening the electrodes to the element. The hole in the holding element 14, receiving the fastener 16, extends through the slots.

Both proximal ends of the electrodes 8 and 10 protrude from the slots of the holding element 14 towards the body 4. The first electrode 8 has an end lateral face in pressure contact with an electrical lead 18 protruding from the body 4 so as to achieve an electrical contact there between. Similarly, the second electrode has an end lateral face in pressure contact with a body portion 4.3 so as to achieve an electrical contact there between. The second electrode 10 is thereby grounded and the first electrode 8 electrically connected to the electrical lead 18.

As this is apparent in FIG. 1, in the present exemplary embodiment, the body 4 comprises a sleeve on the inner side 4.1 thereof, that forms a cavity 20 housing the electrical lead 18 and the body portion 4.3 contacting the second electrode 10. Also, the holding element 14 is snap-fitted into the cavity 20 by engaging with a recess formed in the inner wall of the sleeve 4.4.

Still with reference to FIG. 1, the body 4 forms on its outer side 4.2 a cavity 22 in which the electrical lead 18 also protrudes and is in contact with an electronic display 24 via the electrical contacts 26.

Figure 2:
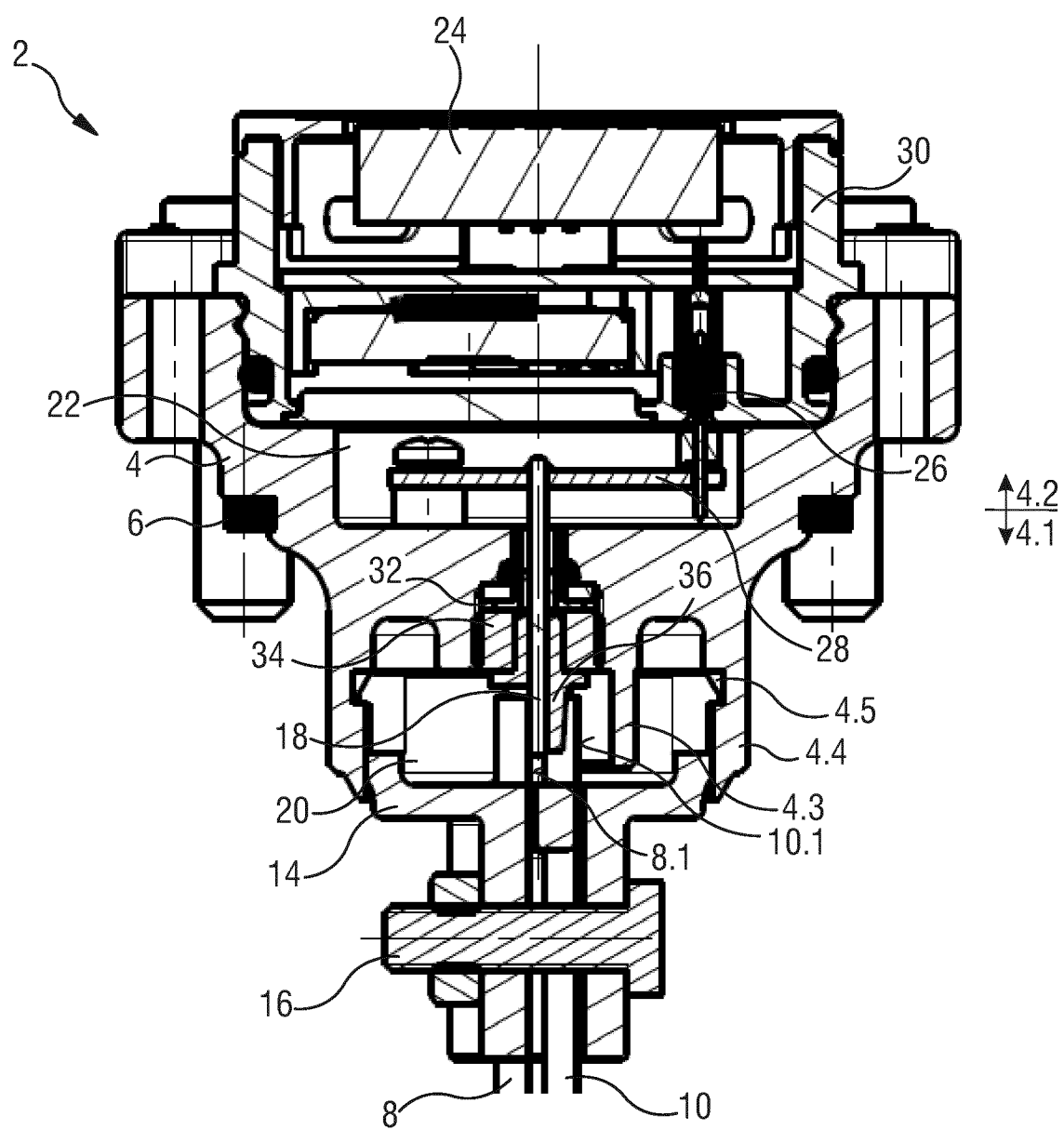
FIG. 2 is an enlarged view of the sectional view of the body of the gauge of FIG. 1, in accordance with various embodiments of the present invention.

FIG. 2 is an enlarged view of the upper part of the sectional view of FIG. 1. Each of the first and second electrodes 8 and 10 shows a cross-section with an arcuate profile, i.e., with a concave side and a convex side opposed to the concave side. Both cross-sectional profiles are, in various instances, parallel, i.e., the convex side of the first electrode 8 is in front of the concave side of the second electrode 10. In the cavity 20, we can observe that this is the convex lateral end side 8.1 of the first electrode 8 that contacts the electrical lead 18. Similarly, this is also the convex end lateral side 10.1 of the second electrode 10 that contacts the body portion 4.3. The latter forms an arcuate wall with two end faces that contact the electrode 10. Since the cut-plane of FIG. 1 does not pass through any of these two end faces, the contact between the second electrode 10 and the body portion 4.3 is not visible in FIG. 2 but well in FIG. 3.

Still with reference to FIG. 2, we can observe that, in the cavity 22, the electrical lead 18 is connected, for instance by brazing, to a plate 28, for instance a printed circuit board or PCB, that is attached to the body by screwing and that shows a pin that engages with the connector 26. The electronic display 24 is mounted on a support 30 that is inserted into the cavity 22 by a movement along the longitudinal axis of the body 4.

The PCB 18 can comprise electronics that is configured for storing the calibration parameters independently from any electrical power source. An electric power source such as a battery can be stored in the support 30 for supplying power to the electronic display 24 and the PCB 18 via the connector 26. This is particularly convenient because when the battery is empty, the support 26 can be removed for replacing the battery without losing the calibration parameters on the PCB 18.

The electrical lead 18 extends through a sleeve 32 and is attached thereto in a gas tight fashion, e.g., with molten glass. The sleeve 32 engages with a bore in the body 4 in a gas tight fashion by means of a gasket, for instance an O-ring, and is secured to the body 4 by a nut 34 with an outer thread engaging with a corresponding inner thread in the bore. The nut 34 holds and presses the sleeve 32 against a shoulder portion of the bore, thereby providing a stable fixation of the electrical lead 18. The mounting of the electrical lead can be according to the teaching of patent application WO 2016/116355 A1.

Still with reference to FIG. 2, we can observe that an annular airgap is provided between the nut 34 and the electrical lead 18. A sleeve 36 of electrically insulating material is slid around the electrical lead 18 and inside the airgap so as to support the electrical lead 18 against the bending force resulting of the radial force of the contact with the first electrode 8, for instance the end lateral side thereof. As this is apparent in FIG. 2, the sleeve shows a cut-out on the portion thereof that protrudes out of the body 4 and on the side of the first electrode, in order to provide some free space allowing the electrode to contact the lead.

Figure 3:
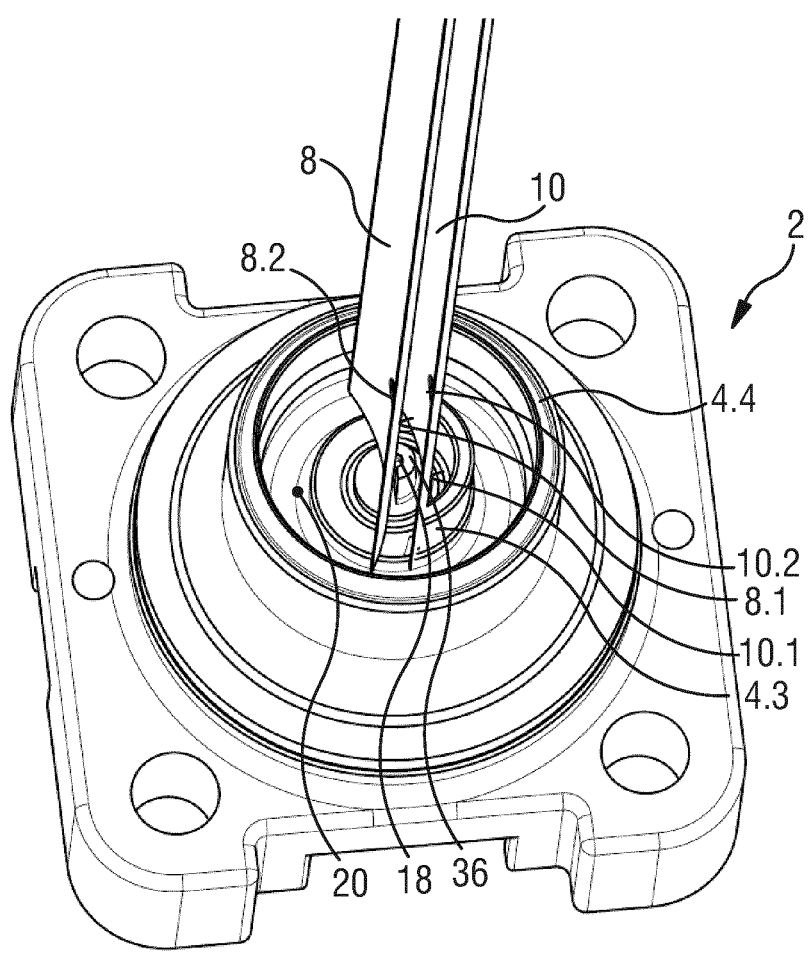
FIG. 3 is a perspective view of the electrical contact of the electrodes on the body of the gauge of FIGS. 1 and 2, in accordance with various embodiments of the present invention.

FIG. 3 is a perspective view of the contact between the electrodes 8 and 10 and the electrical lead 18 and the body portion 4.3. The holding element is not represented for a better view of the contacts. The holes 8.2 and 10.2 in the electrode that receive the fastener 16 through the holding element 14 (FIGS. 1 and 2) are however visible. The arcuate cross-sectional profiles of the electrodes 8 and 10 is also well visible. We can observe that the electrical lead 18 contacts the end lateral face 8.1, for instance the convex end lateral face, of the first electrode 8 at a central position thereof. We can also observe that the body portion 4.3 forms an arcuate wall with two end faces contacting the end lateral face 10.1, for instance the convex end lateral face of the second electrode 10, whereas only one of the two end faces is visible.

Figure 4:
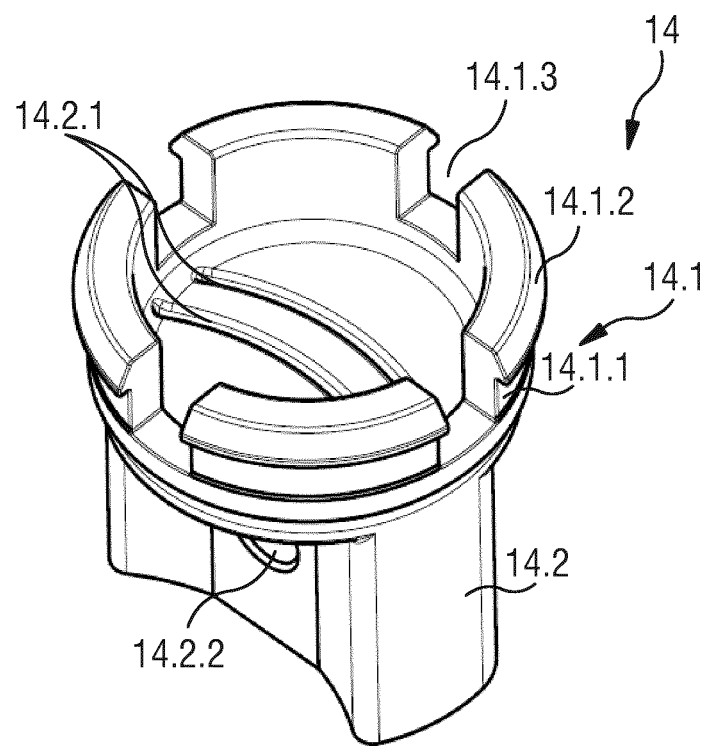
FIG. 4 is a perspective view of the electrode holding element of the gauge of FIGS. 1 to 3, in accordance with various embodiments of the present invention.

FIG. 4 is a perspective view of the holding element 14. It comprises a proximal front end 14.1 configured for engaging with the body and a distal end 14.2 holding the electrodes.

The proximal front end 14.1 comprises a circular wall 14.1.1 provided with a toothed outer profile 14.1.2 for engaging with the recess 4.5 in the sleeve 4.4 of the body (FIG. 2). A series of axial cut-outs 14.1.3 are provided along the wall 14.1.1 so as to form different sections thereof that can more easily bend during insertion of the proximal front end 14.1 into the cavity 20 of the body 4 (FIG. 2).

The distal end 14.2 features the slots 14.2.1 configured to receiving the electrodes. As this is apparent, the slots 14.2.1 show an arcuate profile that corresponds to the profile of the electrodes. The slots extend longitudinally along the whole length of the distal end 14.2 so that the electrodes, once inserted therein, extends through the distal end 14.2 and protrude therefrom in the proximal front end 14.1. The holding element 14 features also a transversal hole 14.2.2 that extends through the slots 14.2.1, designed for receiving the fastener 16 (FIGS. 1 and 2).

When assembling the gauge, the electrodes are inserted through the respective slots 14.2.1 and the fastener 16 (FIGS. 1 and 2) is inserted into the hole 14.2.2 and the corresponding holes 8.2 and 10.2 (FIG. 2) of the electrode so as to form a stable assembly. That assembly is then mounted on the body by an insertion movement along the longitudinal direction, until the distal end portion 14.1, more particularly the toothed profiles 14.1.2, snaps into the recess or groove 4.5 (FIG. 2). During that operation, the holding element 14 can be slightly tilted relative to the longitudinal direction of the body such as to facilitate insertion of the end portion of the electrodes relative to the electrical lead and the body portion. Once the end lateral faces of each electrode has started to pass by the electrical lead and the body portion, the holding element can be aligned with the longitudinal direction until each toothed profile 14.1.2 snaps into the corresponding groove or recess in the body.

Figure 5:
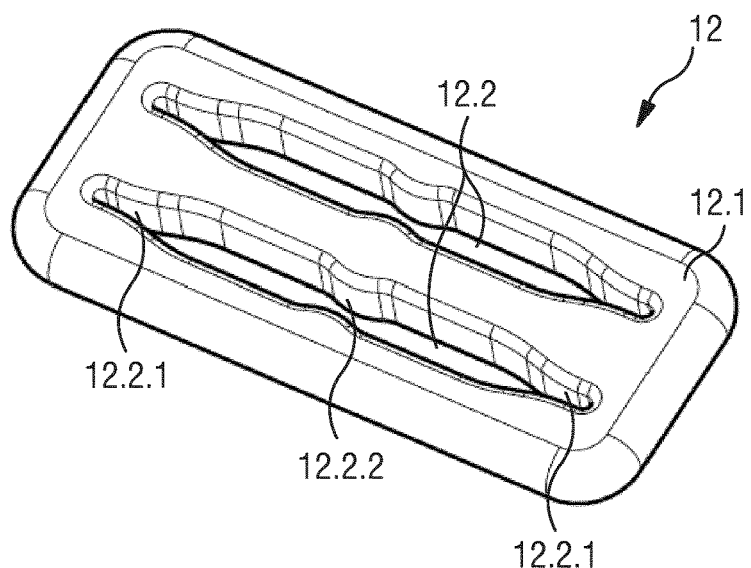
FIG. 5 is a perspective view of the spacer of the electrodes of the gauge of FIGS. 1 and 2, in accordance with various embodiments of the present invention.

FIG. 5 is a perspective view of the spacer 12. It is essentially made of a plate 12.1 with two slots 12.2. Each slot 12.2 is configured to achieve a resilient contact with the corresponding electrode once inserted there into. For instance, when the electrode shows a curved cross-sectional profile, as in the present exemplary embodiment, the slots 12.1 can show a generally straight profile or at least a less curved profile than the electrodes. More specifically, the slots 12.1 show at a main portion a width that is substantially larger than the wall thickness of the electrodes. The slots 12.1 can show ends portions 12.2.1 with a reduced thickness, i.e., of about the wall thickness of the electrodes. It can also show a central portion 12.2.2 also with a reduced thickness, however, in various instances, greater than the wall thickness of the electrodes.

The spacer 12 is advantageously made of plastic, e.g., thermoplastic, by injection moulding. The plate 12.1 can show a thickness greater than 2 mm and/or less than 8 mm. The slots 12.2 can have a length greater than 5 mm and/or less than 30 mm. Each slots 12.2 advantageously shows two opposes profiles that are symmetric with regard to a median plane. The distance between the neutral fibres or axes of two adjacent slots 12.2 of a spacer 12 can be greater than 5 mm and/or less than 20 mm. The plate 12.1 of the spacer 12 advantageously shows a rounded peripheral border.

Figure 6:
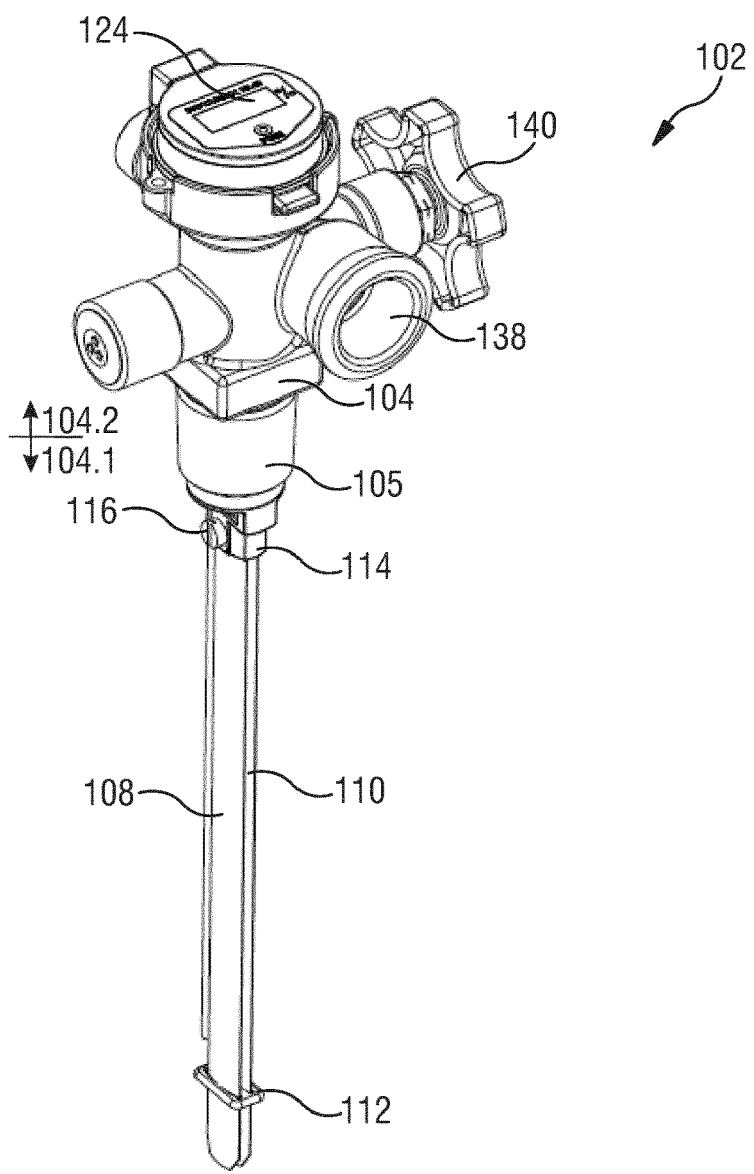
FIG. 6 is a perspective view of a capacitive gauge according to a second exemplary embodiment of the invention.

FIG. 6 is a perspective view of a second embodiment of the invention. It shows a capacitive gauge, similarly constructed to the gauge of the first exemplary embodiment in FIGS. 1-5. The reference numbers of the first exemplary embodiment are used for designating the same or corresponding elements; these numbers being however incremented by 100. It is referred to the description of these elements in relation with the first exemplary embodiment. Specific numbers comprised between 100 and 200 are used for designating specific elements.

The gauge 102 of FIG. 6 differs from that the gauge of FIGS. 1 to 4, essentially in the body 104 which comprises a gas passage between the inner side 104.1 and the outer side 104.2, in connection with the gas outlet 138. A shut-off valve (not visible) is provided in the body 104 and operated by the hand-wheel 140. Such a gas passage, gas outlet and shut-off valve are as such well known to the skilled person and do not need to be further detailed.

Also the body 104 shows a tapered outer thread 105 for engaging in a gas tight fashion a collar of a container. This tapered outer thread 105 replaces the gasket and the holes receiving the fastening screws visible in FIG. 1 of the first exemplary embodiment.

The invention claimed is:

1. A capacitive level gauge for a container of a medium said gauge comprising:
    a body configured for being mounted on the container;
    two parallel lamellar electrodes extending from the body, the electrodes disposable inside the container and in contact with the medium;
    at least one spacer with two slots engaging with the two electrodes and maintaining a constant distance between the electrodes;
    wherein the at least one spacer elastically deforms the electrodes so as to generate frictional forces holding the spacer in place without further fixation means.

2. The gauge according to claim 1, wherein the at least one spacer is made of plastic.

3. The gauge according to claim 1, wherein the at least one spacer comprises a plurality of spacers distributed along the electrodes.

4. The gauge according to claim 1, wherein the at least one spacer is configured to be slid around and along the electrodes.

5. The gauge according to claim 1, wherein for the at least one spacer, the two slots are substantially parallel to each other.

6. The gauge according to claim 1, wherein the electrodes have a curved cross-sectional profile.

7. The gauge according to claim 6, wherein the cross-section profile is curved with a radius that is at least one of greater than 10 mm and lower than 20 mm.

8. The gauge according to claim 1, wherein for the at least one spacer, the two slots are substantially straight.

9. The gauge according to claim 1, wherein each of the slots comprises a main portion and end portions, the end portions having an average width that is less than an average width of the main portion.

10. The gauge according to claim 9, wherein the main portion comprises a central sub-portion with a reduced width.

11. The gauge according to claim 1, wherein each of the slots comprises a straight neutral axis.

12. The gauge according to claim 1, wherein each of the slots is elongate and forms a closed contour.

13. A spacer for electrodes of a capacitive level gauge, said spacer comprising an element with areas configured for receiving and holding the electrodes, wherein the areas are slots configured for receiving lamellar electrodes; and
    wherein each of the slots comprises a main portion and end portions, the end portions having an average width that is less than an average width of the main portion.

14. The spacer according to claim 13, wherein each of the slots is elongate and forms a closed contour.

15. The spacer according to claim 13, wherein the main portion comprises a central sub-portion with a reduced width.

16. The spacer according to claim 13, wherein each of the slots comprises a straight neutral axis.

* * * * *